United States Patent [19]
Murphy et al.

[11] Patent Number: 6,066,591
[45] Date of Patent: May 23, 2000

[54] REACTIVE MEDIUM FOR PURIFYING FLUIDS

[75] Inventors: William L. Murphy; Bruce A. Wilson, both of Homer, N.Y.

[73] Assignee: Pall Corporation, East Hills, N.Y.

[21] Appl. No.: 09/184,349

[22] Filed: Nov. 2, 1998

Related U.S. Application Data

[62] Division of application No. 08/976,118, Nov. 21, 1997, Pat. No. 5,829,139, which is a continuation of application No. 08/433,022, May 3, 1995, abandoned.

[51] Int. Cl.$^7$ .................................................. B01J 20/02
[52] U.S. Cl. .......................... 502/417; 502/4; 502/416; 55/350.1; 55/524; 427/245; 427/244; 427/247; 427/249; 427/327
[58] Field of Search .................. 29/896.62, 458, 29/459, 527.2; 55/524, 350.1; 95/285, 901; 502/4, 416, 417; 423/210; 427/244, 245, 247, 249, 301, 327, 402

[56] References Cited

U.S. PATENT DOCUMENTS

| | | | |
|---|---|---|---|
| 3,145,079 | 8/1964 | Harbaugh | 423/488 |
| 3,288,615 | 11/1966 | Estes et al. | 106/40 |
| 3,530,649 | 9/1970 | Porsch et al. | 55/516 |
| 3,572,014 | 3/1971 | Hansen | 55/516 |
| 3,804,942 | 4/1974 | Kato et al. | 423/239 |
| 4,133,660 | 1/1979 | Steiner | 55/387 |
| 4,177,142 | 12/1979 | Halbfoster | 210/75 |
| 4,242,226 | 12/1980 | Siren | 55/74 |
| 4,329,844 | 5/1982 | Shadman et al. | |
| 4,344,775 | 8/1982 | Klein | 55/75 |
| 4,346,557 | 8/1982 | Shadman et al. | |
| 4,562,039 | 12/1985 | Koehler | 419/2 |
| 4,613,369 | 9/1986 | Koehler | 75/246 |
| 4,613,815 | 9/1986 | Christel, Jr. | 324/233 |
| 4,680,221 | 7/1987 | Murayama et al. | 428/246 |
| 4,685,940 | 8/1987 | Soffer et al. | 55/158 |
| 4,713,224 | 12/1987 | Tamhankar et al. | 423/219 |
| 4,734,339 | 3/1988 | Schachner et al. | 428/701 |
| 4,770,317 | 9/1988 | Podgers et al. | 220/86 R |
| 4,782,226 | 11/1988 | Jeffries, Jr. et al. | 250/227 |
| 4,789,386 | 12/1988 | Vaughn et al. | 55/158 |
| 4,822,692 | 4/1989 | Koehler | 428/547 |
| 4,828,930 | 5/1989 | Koehler | 428/547 |
| 4,853,148 | 8/1989 | Tom et al. | 252/194 |
| 4,855,276 | 8/1989 | Osborne et al. | 502/415 |
| 4,867,960 | 9/1989 | Tom | 423/488 |
| 4,906,263 | 3/1990 | von Blücher et al. | 55/316 |
| 4,916,105 | 4/1990 | Rieck et al. | 502/303 |
| 4,921,823 | 5/1990 | Furneaux et al. | 502/4 |
| 4,938,785 | 7/1990 | MacPherson, Jr. | 55/1 |
| 4,946,592 | 8/1990 | Galaj et al. | 210/490 |
| 4,981,501 | 1/1991 | Von Blücher et al. | 55/316 |
| 5,037,791 | 8/1991 | Comolli et al. | 502/185 |
| 5,114,447 | 5/1992 | Davis | |
| 5,139,747 | 8/1992 | Cato et al. | 422/122 |
| 5,149,360 | 9/1992 | Koehler et al. | 75/228 |
| 5,196,380 | 3/1993 | Shadman | 502/4 |
| 5,204,075 | 4/1993 | Jain et al. | 423/219 |
| 5,262,198 | 11/1993 | Wu et al. | 427/249 |
| 5,302,356 | 4/1994 | Shadman et al. | |
| 5,456,740 | 10/1995 | Snow et al. | 55/524 |
| 5,635,148 | 6/1997 | Shadman | |
| 5,637,544 | 6/1997 | Shadman | |

FOREIGN PATENT DOCUMENTS

| | | |
|---|---|---|
| 508145 | 12/1954 | Canada . |
| 0083489 | 7/1983 | European Pat. Off. . |
| 0340542 | 11/1989 | European Pat. Off. . |
| 0428052 | 5/1991 | European Pat. Off. . |
| 0596441 | 5/1994 | European Pat. Off. . |
| 2251351 | 7/1975 | France ............... 210/506 |
| 745439 | 5/1943 | Germany . |
| 2906510 | 8/1979 | Germany . |
| 50-6440 | 3/1975 | Japan . |
| 52-33170 | 3/1977 | Japan . |
| 52-8794 | 3/1977 | Japan . |
| 53-114571 | 10/1978 | Japan . |
| 55-20667 | 2/1980 | Japan . |
| 59-102419 | 6/1984 | Japan . |
| 63-051918 | 3/1988 | Japan . |
| 312315 | 1/1991 | Japan . |
| 5115735 | 5/1993 | Japan . |
| 5137922 | 6/1993 | Japan . |
| 284808 | 2/1928 | United Kingdom . |
| 944207 | 12/1963 | United Kingdom . |
| 1246483 | 9/1971 | United Kingdom . |
| 2201355 | 9/1988 | United Kingdom ........ 210/505 |
| 950385 | 2/1995 | WIPO . |

OTHER PUBLICATIONS

"The Preparation of and Characterization of Alumina Membranes with Ultra–fine Pores", Journal of Material Science, pp. 1077–1088, 1994.

Leonaars et al., "Porous Alumina Membranes", Chemtech, pp. 560–564, Sep. 1986.

*Primary Examiner*—Tom Dunn
*Attorney, Agent, or Firm*—Leydig, Voit & Mayer

[57] ABSTRACT

A method for forming a reactive medium for removing homogenous and heterogeneous impurities from a fluid is provided which includes forming a uniform oxide layer on all exposed surfaces of a porous metal substrate, depositing at least one layer of carbon on substantially all of the oxide layer formed on the porous metal substrate, depositing a precursor metal species on the carbon layer, and heating the porous metal substrate containing the carbon layer to form active sites on the carbon layer, wherein the active sites include at least partially deoxygenated metal species chemically bonded to the carbon layer. Also provided is a reactive medium for purifying a fluid, the reactive medium comprising a porous inorganic substrate, a layer including carbon and an oxide layer between the porous inorganic substrate and the layer including carbon. The reactive medium further comprises active sites including at least partially deoxygenated metal species, the active sites being bonded to the layer including carbon.

18 Claims, 1 Drawing Sheet

REACTIVE MEDIUM FOR PURIFYING FLUIDS

This application is a divisional of U.S. application Ser. No. 08/976,118 filed on Nov. 21, 1997, now U.S. Pat. No. 5,829,139 which is a continuation of U.S. application Ser. No. 08/433,022 filed on May 3, 1995 and now abandoned, both of which are incorporated by reference in their entireties.

FIELD OF THE INVENTION

This invention relates to a filter assembly used for filtering fluids. More particularly the present invention is directed to a filter assembly used in the filtration and ultrapurification of gases and to a method of filtering and purifying gases.

BACKGROUND OF THE INVENTION

Advances in all areas of modern technology have, to a large degree, depended on the modification and development of new materials and the purification of substances used as both reagents and as materials, in the presence of which various processes are conducted. The purification of many such substances, typically liquids and gases, has required the removal of impurities which are either heterogeneous (such as particles and macromolecules) or homogeneous (such as dissolved substances). Typically, heterogeneous impurities are removed by filtration techniques and devices in which the particles are physically retained by some sort of perforate or porous medium. Other methods and purification techniques are typically chosen to remove homogeneous impurities. Many of these techniques involve the chemical modification and/or the affinity and attraction of the homogeneous impurity and the resulting removal of such material from the fluid.

In many areas of modern technology, the concentration of impurities above several parts per million (ppm) cannot be tolerated and in certain technologies, such as in the manufacture of semiconductor devices, the concentration of impurities in both the substances used as reagents as well as other materials, in the presence of which the processes are conducted, can still be detrimental even at levels at or below several parts per billion (ppb). For example, in many of the process gases employed in manufacturing semiconductor devices, impurities such as moisture, oxygen and organic compounds in even trace amounts can be adsorbed on the semiconductor wafer, causing degradation of performance, reduced manufacturing yield and adverse reliability.

In such applications, to remove homogeneous impurities from process gases, various commercial purification techniques and purifiers which involve physical adsorption and chemisorption of impurities or conversion of impurities to other forms which can be adsorbed on a solid substrate are employed. Most of these purification techniques employ a packed bed of particles or expanded materials. Examples of such materials include various resins (e.g., Nanochem® resins) and various alloys (e.g., Zr—V—Fe alloys). For purification by this technique, the gas stream is passed through these packed beds and the impurities react with the sorption material. While capable of removing impurities on the ppm level, these purification materials often do not effectively filter trace homogenous impurities, such as reactive gases, present at the ppb level. Moreover, these packed beds tend to be ineffective when there is an abrupt surge in the impurity level due to the inefficiency of the packed beds in effecting contact between impurity molecules and the resin or alloy of the bed material. In addition, because such materials themselves tend to generate heterogeneous impurities because of mechanical motion and attrition of particles of the packed bed material, they have limited service lifetimes. Furthermore, these materials are typically not reusable and often cannot be regenerated.

For the removal of particulate material, various porous ceramics have been employed. For example, U.K. Patent No. 2,201,355 to Dahlquist et al. employs a porous membrane for separating heterogeneous impurities from an aqueous medium. The porous membrane comprises an outer support matrix having through-passages and an inner layer lining the through-passages and deposited on the outer support. A polymer, metal or ceramic is used as the support matrix. The inner layer is a matrix of particles of aluminum hydroxide, partially hydrated aluminum oxide, silicon dioxide or zirconium dioxide. French Patent No. 2,251,351 describes a microporous ceramic filter that includes a microporous ceramic support electrophoretically coated with an oxide of Al, Si, Mg, Ti, Cr, Ni, Zr or Fe. U.S. Pat. No. 3,288,615 to Estes et al. describes a ceramic filter body that includes a framework of one or more tectosilicates with a mineral species (e.g., aluminates and oxides) distributed throughout and filling the framework.

While these and other filtration and purification materials permit removal of impurities with varying degrees of success from a gas stream during operation, significant potential for introduction of contamination to the system occurs during start-up periods. This is particularly true when the filtration or purification device is placed into service in the process stream. Thus, referring to FIG. 1, which illustrates in section a conventional filter device used in gas process streams, a filter is incorporated within a housing through which the gas stream flows. More particularly, the device 1 includes a fluid purification filter 3, often a reactive gas filter, disposed within the housing 5 having a fluid inlet 7 and fluid outlet 9 formed as fluid connectors at opposite ends of the housing. Such an arrangement requires that all of the gas pass through the fluid purification filter 3 before reaching the outlet 9. Prior to use, caps, typically formed from a metal material, are placed over the inlet and outlet connectors, 7 and 9, to keep dust, other particulate contaminants, and in some instances, fluids, from entering the housing. Immediately prior to use, the caps are removed so that the housing may be inserted into the system. Devices with structures of the type shown in FIG. 1, however, allow for the introduction of contaminants from a number of sources to the system.

One source of contamination originates within the housing 5 between the filter 3 and the inlet 7 from air or other fluid present in or flowing into the upstream portion of the housing through the inlet 7 when the device is installed in the process stream. In many instances, air, components of air or impurities in air, are detrimental to the process stream and the reactive gas filter is capable of removing the undesirable components or impurities present in the air which would adversely affect the process stream. Once the device is installed in the process stream and flow begins to pass from the process stream through the housing, the air initially present in or entering the housing through the inlet does not introduce further impurities to the process stream since the stream passes through the filter 3. It is, however, desirable to minimize the amount of air, contaminants, etc. entering the device since the filter 3 has a limited capacity to remove impurities. To minimize the amount of air entering the process stream at the inlet 7 when the device is installed, a valve, such as a poppet valve, could be placed within the inlet 7 and the housing pressurized with the gas employed in the process stream while the outlet of the housing is capped. However, while such an approach is effective in some instances to flush a filter device such that it may be used immediately after the device is capped, in other instances there is the potential for introduction of a second source of contamination into the process stream. Thus, depending upon the location and climatic conditions where the filter device is pressurized and the location and atmospheric pressure where the filter device is used, the gas in the downstream side of the filter housing, between the filter 3 and the outlet 9, may be displaced by atmospheric air or other fluid in the vicinity of the housing stream once the cap is removed from the outlet and the filter housing is connected in the fluid stream. Although in some instances it may be possible to flush the filter device with an inert gas or the gas employed in the process stream at the time the device is placed into service, this requires one or more additional steps.

With current technologies, in addition to sources of contamination introduced from the ambient environment of the filtration/purification assembly when the device or assembly is placed into service, contamination may be introduced by diffusion of atmospheric contamination located in the vicinity of the inlet and particularly the outlet of the housing. While the concentration of such contaminants may be very small, in particular applications even trace amounts of such contaminants may be detrimental to the processes and products involved.

SUMMARY OF THE INVENTION

The present invention is directed to a filtration/purification assembly for use in fluid streams, preferably gas streams, which is capable of removing contaminants from the fluid stream and which avoids introduction of contaminants to the fluid stream and fluid assembly at the time the filter assembly is placed in operation. The filtration/purification assembly of the present invention is capable of reducing both homogeneous and heterogeneous contaminants to concentrations in the ppb to parts per trillion (ppt) range. The present invention is also capable of minimizing or eliminating contamination from entering the filtration/purification assembly, and hence the fluid stream, at the time the filtration/purification assembly is placed into service and start-up of the fluid stream is commenced. This results in greater capacity and longer service life for the assembly.

The filtration/purification assembly of the present invention which provides such filtration and purification levels includes a housing having a fluid inlet and a fluid outlet. Disposed within the housing between the fluid inlet and fluid outlet, and extending across a fluid flow path provided therebetween is a fluid permeable, reactive filter medium, preferably a gas permeable reactive medium. At both the fluid inlet and fluid outlet are disposed barrier members. As defined with respect to the present invention, "barrier member" is a member which prevents particulate and fluid contaminants from entering the inlet or outlet, and thereby the housing. In some instances the member may be used to prevent entry of all fluids to the housing, except under controlled conditions. The barrier member may be a medium or membrane or, a device, such as a valve. It is preferred that at the fluid outlet the barrier member take the form of a medium, preferably a type of a reactive medium, similar to the fluid permeable, reactive filter medium disposed intermediate the fluid inlet and fluid outlet and employed as the main means of removing the bulk of contaminants entering the housing. At the inlet, it is preferred that the barrier member be either a valve, such as a poppet valve, or a medium, such as a reactive medium, also similar to the fluid permeable, reactive filter medium used in the interior of the housing.

The reactive medium employed in the present invention includes a porous inorganic or organic substrate, preferably a metallic substrate having exposed surfaces, and including at least one carbon layer deposited on substantially all of the exposed surfaces of the substrate. The carbon layer is modified to present active sites which include at least partially or substantially deoxygenated metal species chemically bonded to the carbon layer. As used herein, the terms "rat least partially deoxygenated metal species" and "substantially deoxygenated metal species" refer to metals which have been reduced so as to be chemically bound to less than the stoichiometric amount of oxygen.

The device according to the present invention is highly effective in removing a variety of contaminants, both heterogeneous and homogeneous, from fluids, particularly gases. Accordingly, the purification system of the present invention may find application in a variety of processes. For example, the filter assemblies of this invention may be employed in the removal of gaseous and particulate contaminants in gas or liquid source streams used in electronics manufacture. Depending upon the selection of the partially deoxygenated metal species which forms part of the reactive medium, trace impurities such as oxygen, water, carbon monoxide, carbon dioxide, methane and other hydrocarbons may be removed from a gas stream (e.g., a stream of an inert or noble gas such as nitrogen or argon). In addition to inert gas streams, the present invention may be employed to remove moisture from streams of reactive gases such as oxygen, silanes, hydrogen chloride and hydrogen bromide.

The device of the present invention is capable of reducing the total concentration of impurities, both heterogenous and homogeneous, to no more than about 10 ppb, preferably to no more than about 1 ppb, and in some instances below 10 ppt. The device according to the present invention is capable of reducing, in an inert gas stream, the concentration of water, oxygen or carbon monoxide to no more than about 10 ppt, methane and other hydrocarbons to a concentration of no more than about 10 ppt and preferably to no more than about 2 ppt and carbon monoxide to no more than about 12 ppt.

As indicated above, in addition to purifying gases, once inserted into a fluid stream, the filtration/purification assembly of the present invention is also able to remove impurities from ambient fluids, particularly gases, such as air, at the time the device is placed into service. This is true independent of such factors as whether the device is pressurized at the time of manufacture or prior to use, where the device was manufactured or what ambient conditions existed at the time of manufacture or use. Thus, a barrier member located at the inlet of the assembly will minimize or substantially eliminate entry of contaminants to the housing. In most instances, there is little to no chance of contaminants being present in the gaseous volume in the portion of the housing between the housing inlet, or the upstream barrier member, and the reactive filter medium, known as the "upstream capture volume". However, even if trace quantities of contaminants are present, once the device of the present invention is connected in line to the fluid stream at both the inlet and outlet provided in the housing, initiation of fluid flow will cause fluid in the upstream capture volume to pass through the reactive medium, thereby removing any homogeneous and heterogeneous contaminants in the upstream capture volume. Likewise, particularly when the barrier member at the outlet end of the housing is formed from the same or a similar material as the reactive filter medium, contaminants present in the "downstream capture volume" (the volume of gas in the portion of the housing defined by the walls of the housing, the reactive medium and the outlet end of the housing or barrier member located at the outlet) will be substantially retained by the reactive filter medium in the outlet when the filtration/purification assembly is placed in a fluid stream. As a result, the barrier members employed in the invention increase the capacity and extend the service life.

In addition to being capable of reuse and long service life, the reactive filter device of the present invention is also capable of being regenerated.

As suggested above, the present invention is also directed to a method for filtering and purifying fluids, particularly gases, to remove heterogeneous and homogeneous impurities to levels of several hundred ppt and in some instances down to below the 10 ppt level. Such a method involves placing the assembly in a fluid stream, such as a gas stream, and providing fluid communication to the inlet of the housing such that the fluid passes through the reactive medium which retains the contaminants present in the fluid stream and provides purified effluent.

The present invention also relates to a method of preparing a reactive filtration/purification medium and to a method of forming a reactive filtration/purification assembly. The medium and the reactive filtration/purification assembly itself produce higher purity fluid streams and demonstrate an increased capacity to remove impurities compared to known systems. The method of forming the improved reactive medium according to the present invention involves forming a uniform oxide layer on all exposed surfaces of a porous organic or inorganic substrate, preferably a metal substrate. Thereafter, at least one layer of carbon is deposited on substantially all of the oxide layer formed on the porous metal substrate and afterwards a precursor metal species is deposited on the carbon layer. Subsequently, the porous metal substrate containing the carbon layer is heated to form active sites on the carbon layer such that the active sites include at least partially deoxygenated metal species chemically bonded to the carbon layer. In forming the filtration/ purification assembly, the porous substrate is disposed in a housing section prior to formation of the uniform oxide layer and subsequent treatments.

The uniform oxide layer of the metal substrate is preferably formed by initially contacting all of the exposed metal surfaces of the metal substrate with a reducing agent. Thereafter, the treated metal surfaces are contacted with an oxidizing agent at an elevated temperature. According to the preferred method of forming the reactive medium, the uniform oxide coating provided on the exposed metal surfaces of the substrate serves to initiate the deposition of carbon and to achieve improved anchoring or bonding of the carbon to the substrate. This ultimately results in a greater number of active sites on the medium.

The present invention further relates to a reactive medium for purifying fluids. The reactive medium comprises a porous metal substrate, a layer including carbon, and an oxide layer between the porous inorganic substrate and the layer including carbon. The reactive medium further comprises active sites including at least partially deoxygenated metal species, the active sites being bonded to the layer including carbon.

DESCRIPTION OF THE PREFERRED EMBODIMENTS

Figure 1:
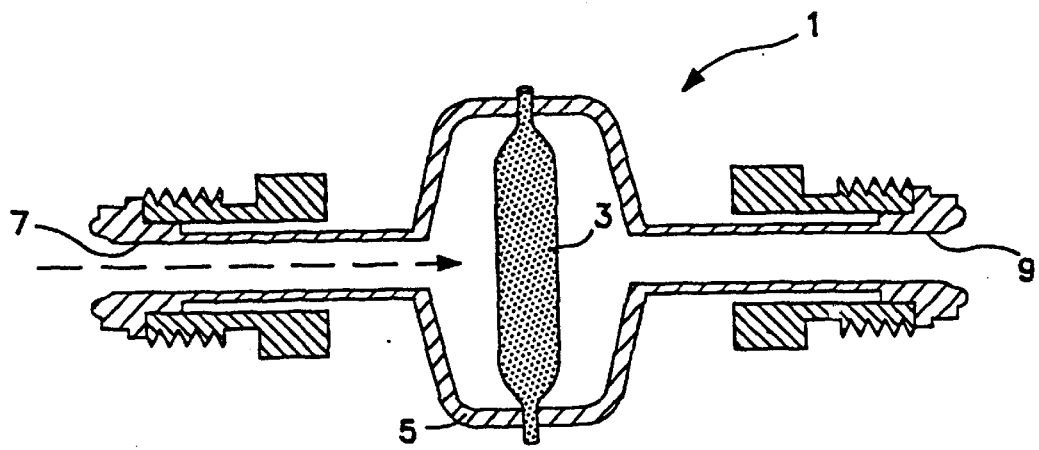
FIG. 1 is a sectional view of a conventional gas filtration device.
Figure 2:
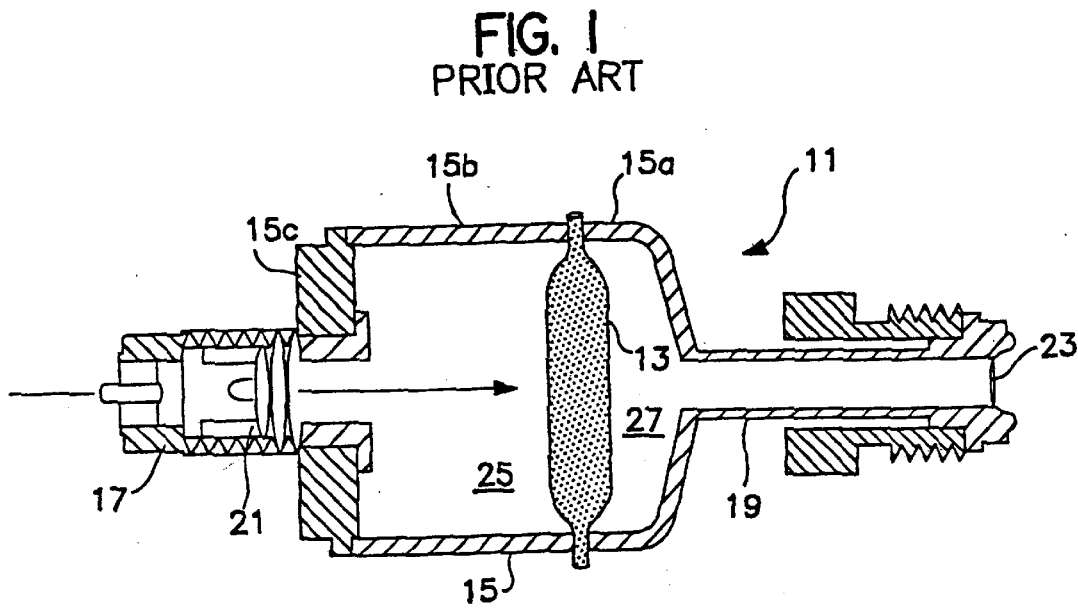
FIG. 2 is a sectional view illustrating an embodiment of the present invention.

An embodiment of the present invention is illustrated in cross-section in FIG. 2. This embodiment includes a reactive filtration/purification assembly 11 which incorporates a reactive filter medium 13 disposed within a housing 15 transverse to the fluid flow direction, as indicated by an arrow in FIG. 2. The reactive filter medium 13 is so positioned and affixed within the housing 15 that all fluid entering the housing must flow through the reactive filter medium. At one end of the housing 15 is provided a fluid inlet 17 and at the opposite end of the housing is provided a fluid outlet 19. While the housing may have any configuration, provided that the reactive filter medium extends completely across the fluid flow path in the housing between the fluid inlet 17 and the outlet 19, a preferred configuration is a cylindrical housing 15, such as that illustrated in FIG. 2, in which a circular reactive filter medium 13 is placed centrally or coaxially within the housing. Within the inlet 17 and in fluid communication with the interior of the housing, particularly the upstream capture volume 25, is a first barrier member 21. Located within the outlet 19, preferably at or proximate the opening of the outlet at which effluent fluid emerges from the assembly, and in the fluid communication with the housing, particularly the downstream capture volume, is located a second barrier member 23.

The function of both the first barrier member 21 and the second barrier member 23 is to minimize or substantially eliminate entry of either heterogeneous or homogeneous contaminants to the filter housing 15 prior to placement of the assembly into service in the fluid stream, and thereby increase the capacity and service life of the assembly. Typically, such barrier member takes the form of either a valve or a type of reactive filter medium similar to that used to remove the bulk contaminants from the fluid stream passing through the housing (i.e., reactive filter medium 13). The embodiment illustrated in FIG. 2 includes a valve, in this instance a one-way valve such as a poppet valve at the inlet. A type of reactive filter medium is located at the outlet. The embodiment illustrated in FIG. 3 includes a type of reactive filter medium as the barrier member at both the inlet and outlet of the filtration/purification assembly device.

Preferred as the barrier member 23 (and 23'), located at the downstream opening of the outlet 19, is another or second reactive filter medium, similar in some respects (as discussed below) to the first or main reactive filter medium 13.

Figure 3:
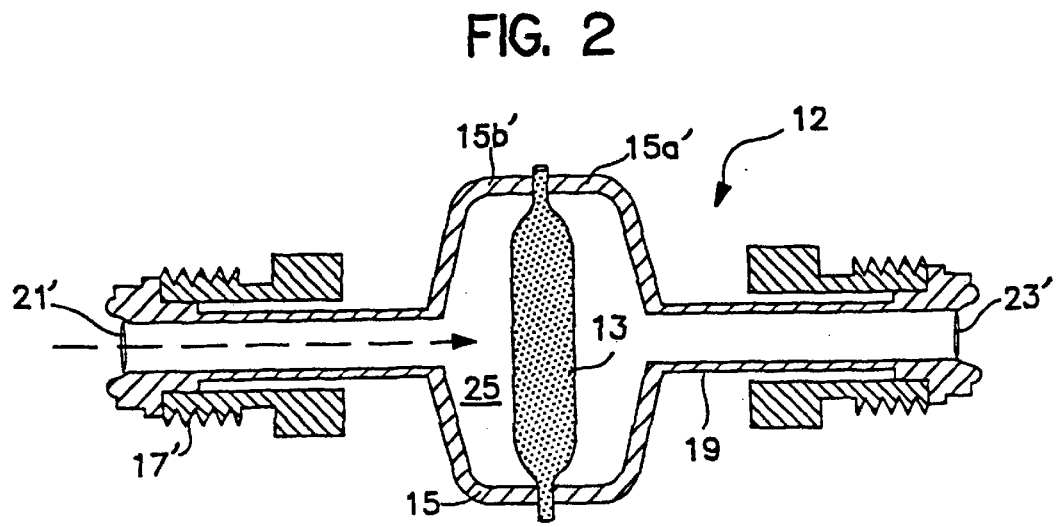
FIG. 3 is a sectional view illustrating another embodiment of the present invention.

The barrier member 21 (or 21'), provided at the inlet 17, is a poppet valve in the embodiment of FIG. 2 (and a reactive filter medium in the embodiment illustrated in FIG. 3). Thus, in the embodiment illustrated in FIG. 3, the barrier members 21' and 23' are of the same type, i.e. reactive filter media which are similar to the fluid permeable, reactive filter medium 13, located within the housing. It is also preferable in the embodiment shown in FIG. 3, that the materials from which barrier members 21' and 23' are made are the same. Depending on the particular application, the barrier members 21' and 23' may have the same or different fluid flow characteristics as each other.

It is preferred to locate the barrier member 23 (or 23') in the fluid outlet 19 proximate the downstream opening to minimize or substantially eliminate the volume between the tip of the outlet and the barrier member 23 (or 23') to prevent ambient gases from entering the housing 15 and the fluid stream as the assembly is being inserted into the line. It is also preferred, but is not as important as with the downstream barrier member 23 (23'), to place the upstream barrier member 21 (or 21') near the inlet 17 since any fluid flowing into the housing will be filtered and purified by the main reactive filter medium 13 before reaching other parts of the fluid stream.

Other than those reactive filter media used as barrier members, the purification system of the present invention has been described thus far and illustrated in FIGS. 2 and 3 as having a single layer or sheet of reactive filter medium 13 fixedly positioned within the housing between the inlet 17 and the outlet 19. While this embodiment is suitable for most applications, and is preferred because of ease of manufacturing and other reasons, there may be instances in which a plurality of sheets of reactive filter medium, in spaced relationship to one another, may be substituted for the single sheet reactive filter medium. Thus, in some instances two or more sheets of reactive medium having the same or different fluid flow or chemical composition characteristics, may be arranged in series within the body of the housing. In such instances, the overall pressure drop across the serially arranged sheets must meet the requirements of the particular application in which the assembly is employed.

In a similar manner, rather than the single layer or sheet of reactive medium 21' employed as the barrier member in an embodiment of the type illustrated in FIG. 3, a plurality of sheets, preferably two, of reactive medium may be substituted for the single sheet illustrated.

In addition, upstream of the barrier member employed in the inlet, typically the reactive filter medium(s) 21', a filter element (not shown) may be provided to trap larger particulate material. Such filter element may be formed from a material which is inert under coating, purification and filtration conditions and which will not contain or form volatile substances. The material should be of an appropriate porosity to trap particulate material slightly larger than would be retained by any reactive filter medium used in the device. Typically organic polymeric and metal materials may be used in the upstream filter. The filter element may be a surface filter or a depth filter, appropriate to the situation. Such an embodiment is not expected to find widespread application in the electronics industry, particularly in the semiconductor industry, since the fluids employed therein may contain some particulate material but of relatively low proportions and of a very fine nature.

The preferred reactive filter media of the present invention are similar to those of the type described in U.S. Pat. No. 5,637,544, specifically incorporated herein by reference. Such reactive filter media include at least one substrate layer, preferably an inorganic substrate layer, having a plurality of pores therein, at least one layer of carbon deposited on each substrate layer and coating the pores thereof, and at least one reactive layer of a metal in reduced form (i.e., a partially or substantially deoxygenated metal species) which is chemically bonded to the carbon layer and is capable of reacting with impurities in a gas. As indicated above, reactive media filters are different than most types of existing filters in that in addition to being able to remove heterogeneous impurities, they are also capable of significantly reducing homogeneous impurities by interacting with and removing trace impurities.

When used as the main, fluid permeable, reactive filter medium 13, between the inlet and outlet of the housing, typically the medium constitutes a composite medium in which a plurality of coated substrate layers contact each other. The number of substrate layers employed for the reactive filter medium 13 depends on factors such as pressure drop across the reactive filter medium or matrix of media, particle removal efficiency and total contaminant removal capacity. Typically the number depends on the surface area and fluid flux necessary to achieve a satisfactory separation layer. When used as the barrier member 21', 23 or 23', the number of layers is generally fewer than the number used in the reactive filter medium 13 and is typically one to several layers.

With thinner reactive medium filters or barrier members, particularly the latter, when the medium tends to be relatively non-self-supporting, it may be desirable to include a foraminous metal support within or surrounding the barrier member or filter member. Typically this is a very open pore material, such as a metal mesh, particularly a stainless steel mesh. Suitable would be any open pore fibrous or powder material or mesh in various configurations. Preferred is a K-mesh material, which is a fine wire stainless steel mesh. Most preferred is a substrate such as that available from Pall Corporation under the tradename of "ULTRAMET-L" which includes fine stainless steel fibers in a support envelope of a fine stainless steel mesh screen.

The inorganic substrate is preferably a porous metal substrate. Of the metals employed as the substrate, high alloys or corrosion resistant metals and alloys, such as stainless steel, are preferred. Exemplary of suitable metals are nickel, the Hastalloy family of metals, the Monel family of metals, 316 L stainless steel and other similar alloys. The metallic substrates are formed from metal particulate, such as metal powder, metal fibers or combinations thereof. Preferred are substrates formed from metal fibers. Suitable for use in the invention are fibers having diameters of less than about 0.1 to about 12 microns, preferably about 0.1 to about 4 microns.

Prior to coating, the metal substrates of this invention have a pore rating of about 0.5 microns to about 10 microns, preferably about 2 microns to about 6 microns. The void fraction of the uncoated metal substrate ranges from about 50 to about 95% voids, preferably about 60 to about 80% voids.

The thickness of the carbon layer deposited on the porous substrate ranges preferably from about 50Å to about 1000Å. While coating the substrate with carbon may reduce the pore rating and concomitantly increase the $\Delta P$ across the medium, the particular application of the assembly determines whether the $\Delta P$ adversely affects the use of the assembly.

The carbon layer is modified to present active sites which include at least one metal species in reduced form chemically bonded to the carbon layer. The metal species is capable of reacting or otherwise interacting with the impurities of the gas stream in its reduced form. The term "reduced form" relates to the oxidation state of the metal in that oxygen is chemically combined with the metal in less than the stoichiometric amount normally present in the metal oxide (i.e., the metal species is partially or substantially deoxygenated). The reduced form of the metal may consist of metal or metal suboxides chemisorbed on carbon as well as metal-carbon intercalate compounds. In other words, the carbon layer is modified to present active sites which include partially or substantially deoxygenated metal species that are chemically bonded to the carbon layer. Preferably, the active sites include substantially deoxygenated metal species, which are capable of reacting with trace impurities in a gas stream. Examples of metals or their suboxides which may be employed include manganese, magnesium, and alkali metals such as lithium, sodium and potassium.

An exemplary technique for depositing the carbon layer on the substrate is a chemical vapor deposition (CVD) technique via the disproportionation of carbon monoxide (CO) or the dissociation of other carbon sources such as various hydrocarbons. The deposition can occur under various reaction times, temperatures, and gas compositions, the control of which being within the skill of one in the art. For example, if CO is used as the carbon source, the disproportionation may be conducted at a temperature above about 250° C. using a gas mixture of about 5 to 15 percent by volume CO, 1 to 5 percent by volume hydrogen and the remainder a relatively inert gas such as nitrogen. Preferably, the disproportionation is carried out using a mixture of CO and hydrogen, which contains from about 6% to about 14% hydrogen (by volume), at a temperature of from about 350° C. to about 450° C. The thickness and amount of carbon deposited may be controlled by adjusting the reaction time, temperature, gas composition and gas flow rate. For example, good carbon deposition may be achieved at about 435° C. on a 1.1" diameter filter disk formed from sintered stainless steel fibers using about an 88/12 (vol/vol) mixture of CO and hydrogen at a total gas flow rate through the filter disk of about 500 cc/min.

The formation of the active sites may be carried out by first depositing a precursor metal species on the carbon layer. The former may include an oxidized form of the metal and/or a deoxygenated form of the metal. The precursor metal species may be deposited by using a chemical vapor deposition technique, such as CVD, e.g., forming a vapor of the precursor metal species to be deposited and contacting the layer of carbon deposited on the porous substrate layer with the precursor metal species vapor. The vapor, for example, may be generated from the metal itself or from a hydroxide or oxide of the metal. The temperature for deposition depends on the specific porous substrate and precursor metal species employed and, typically, is greater than about 300° C.

As an alternate method, the precursor metal species may be deposited from a mixture which includes a solvent or liquid medium and the precursor metal species, e.g., a solution or slurry of the precursor metal species in the solvent or liquid medium. Solutions of metal-bearing compounds, such as metal hydroxides or oxalates, may be employed to impregnate the carbon coated substrate with the metal precursor species. For example, if manganese is used, an aqueous solution of manganese oxalate is suitable for such purpose.

A preferred method of depositing the precursor metal species is to dissolve or form a slurry of the precursor metal species in a non-aqueous liquid medium. Preferably, the non-aqueous solvent is one which may be easily evaporated without leaving a residue, e.g., a solvent such as anhydrous liquid ammonia. Exemplary solutions of a precursor metal species in a non-aqueous solvent include solutions of an alkali metal, such as sodium, in anhydrous liquid ammonia. If metals, which are insoluble or only sparingly soluble in a non-aqueous solvent, such as anhydrous liquid ammonia, are to be used as the precursor metal species, a slurry of a very fine powder of the metal can be suitable for depositing the metal on the carbon layer. The solution or slurry of the precursor metal species is passed through the carbon-coated porous substrate, thereby depositing the precursor metal species on the carbon layer. Nitrogen or another inert gas may be used to force the solution or slurry through the porous substrate or suction may be used to draw the solution or slurry through the porous substrate.

After passing the solution or slurry through the porous substrate to deposit the metal precursor species on the carbon layer, the non-aqueous solvent may be driven off by purging with an inert gas such as nitrogen. Gradual heating to about 110° C. and, preferably 200° C. or greater, may facilitate the purging process.

The carbon-coated substrate bearing the deposited precursor metal species is then heated to form metal species chemically bonded to the carbon layer, i.e., to form active sites on the carbon layer. The term "chemically bonded" is intended to include ionic and covalent bonds and van der Waals forces. In other words, "chemically bonded" includes absorbed metal and metal suboxides on carbon as well as various metal-carbon groups and intercalate compounds. Typically, the chemical bonding is accomplished by heating the substrate to greater than about 300° C., preferably above about 380° C. to about 400° C., and most preferably above about 500° C., thereby forming the active sites on the carbon layer. The formation of the active sites may be carried out by heating the carbon-coated substrate in an inert atmosphere such as inert or noble gases such as nitrogen, argon, helium, and the like. If the active sites include lithium, potassium or magnesium species, argon or helium is preferably used to provide the inert atmosphere. The presence of the inert atmosphere lessens the opportunity for impurities in the atmosphere and, in particular, oxidizing impurities, to come into contact with the medium being activated. If impurities are present in the gas in contact with the medium during the activation process, the impurities may interact with and consume active sites. The loss of active sites may adversely affect the impurity removal capabilities of the reactive medium. Preferably, the activation process is carried out in an atmosphere of ultra pure inert or noble gas to avoid the deactivation of active sites due to trace impurities in the gas. The inert gas may also include a reducing gas, e.g., hydrogen, to facilitate active site formation. Preferably, the inert gas employed during the activation process includes hydrogen in a concentration of at least about 1 percent, more preferably from about 2 to about 35 percent, most preferably from about 4 to about 10 percent. In another embodiment, the activation process may be carried out by heating the substrate to greater than about 300° C. under vacuum.

Typically, the substrate is heated to greater than about 500° C. and maintained at that temperature for a suitable amount of time to form the active sites (e.g., about one hour) while being purged with a mixture of a inert gas preferably having at least about 4 percent hydrogen. This activates the active sites of the carbon layer by reacting the precursor metal species with the carbon to form active sites on the substrate, i.e., to form metal species chemically bonded to the carbon layer. The metal activated sites may exist in the reduced form (C-M), as an adsorbed metal, as a metal suboxide, or in oxidized form ($CO_2M$), with the removal of the oxygen necessary to have the preferred highly reactive reduced form. Stated otherwise, the metal in reduced form has no, or less than a stoichiometric amount of, oxygen, i.e., the metal species is partially or substantially deoxygenated. Preferably, the metal species is substantially deoxygenated. Preferably, the chemical bond anchors the reactive metal species to the carbon and the carbon is anchored to the porous substrate. Thus, because the metal species and carbon are anchored, contamination of the gas stream during filtration/purification assembly is avoided.

In another embodiment, several different metals can be deposited sequentially or as a mixture onto the carbon layer to permit removal of selective impurities as the gas passes through each of the layers of the filter medium. In still another embodiment, the reactive medium may include two or more layers of carbon deposited on the exposed surfaces. Each carbon layer may be individually modified to present active sites. Such media may be produced by sequentially depositing a carbon layer, depositing a precursor metal species on the carbon layer and then heating the medium to form the active sites on the carbon layer. This sequence may be repeated until the desired number of activated carbon/metal layers has been produced. Reactive media, which include at least two carbon layers with each layer presenting active sites, have a number of advantages. Such multi-carbon layer media have a very high impurity removal capacity. The active sites on the carbon layers may include more than one metal species. For example, a reactive medium may include first and second carbon layers deposited on substantially all of the exposed surfaces of the porous inorganic substrate. The first carbon layer may be modified to present active sites which include at least partially deoxygenated first metal species chemically bonded to the first carbon layer and the second carbon layer may be modified to present active sites which include at least partially deoxygenated second metal species chemically bonded to the second carbon layer. This may permit the use of two metals which require different deposition methods (e.g., one via CVD and the other via solution deposition).

The present reactive media are highly effective for removing a variety of impurities from a gas. For example, a reactive medium embodying the present invention may be used to remove an impurity, such as oxygen, water, carbon monoxide, carbon dioxide or methane, from a gas stream, e.g., a stream of an inert or noble gas such as nitrogen or argon.

The present reactive media may also be used to remove moisture from streams of reactive gases such as oxygen, silanes, hydrogen chloride and hydrogen bromide. Typically, reactive media having active sites which include sodium or magnesium species chemically bonded to the carbon layer, may be employed for this purpose. Even though the reactive gas may react with the active sites, moisture may still be chemisorbed by the reactive medium (i.e., the water interacts with the active sites, thereby substantially removing the water from the reactive gas). For example, although HCl or HBr may react with an active site (e.g., active sites which include magnesium species) to form a metal halide, moisture may still be chemisorbed by the metal halide to form a hydrate. Similarly, oxygen may react with the metal species of the active sites to form an oxidized site. Since the oxidized sites are capable of interacting with moisture, the reactive media of the present invention may be employed to remove trace levels of moisture from a reactive gas like oxygen. Reactive media embodying the present invention may also be used to remove oxygen from silanes.

In operation, a gas stream including impurities, is passed through filtration/purification assembly of the invention including the reactive filter medium, which medium may have any one of a variety of known configurations. It is recognized that a liquid stream could also be filtered/purified by altering the medium in a manner known to those skilled in the art. Heterogeneous particles are removed from the gas stream by well known filter mechanisms. The active sites of the medium interact, and preferably react, with trace homogeneous impurities present in the gas stream (e.g. oxygen, carbon dioxide, carbon monoxide, water, organic compounds and the like) thereby removing the homogeneous impurities from the gas stream. Although not wishing to be bound by any theory, it is thought that substantially all of the impurity molecules come in contact with the metal molecules of the reactive layer, interact, and are removed by the medium from the gas being filtered and purified. In other words, the impurities interact with the metal species which are bonded to the active sites of the carbon layer, thereby scavenging and removing the impurities from the gas phase.

Once purification is complete and all of the reduced metal is oxidized or otherwise deactivated by contaminants, the medium may be regenerated by heating the substrate to greater than about 300° C. in an inert atmosphere (e.g., nitrogen or argon) to reduce the oxidized metal (i.e., regenerate the active sites). Alternatively, the regeneration may be carried out by heating the deactivated reactive medium to greater than about 300° C. under a hydrogen-containing atmosphere. The regeneration capability of the reactive medium, a process which may be repeated several times, provides a significant advantage over known filtration/purification assembly materials which typically may be used only once and for which there are apparently no known means of regeneration. Regeneration is a feasible option with those embodiments of the invention in which, as necessary, the reactive filtration/purification assembly may be disassembled to provide access of the media to carbon coating and to remove valve type barrier members from exposure to high temperatures and contact with carbon or carbon-producing materials.

The medium within the filtration/purification assembly of the invention is typically regenerated after use by heating the housing portion containing the medium to at least about 300° C., preferably to greater than about 450° C., most preferably to a temperature of about 450° C. to about 550° C., in an inert or noble gas atmosphere (e.g., nitrogen, argon, helium and the like). The carbon layer may participate in regeneration of the active sites in that, on heating in an inert atmosphere, the carbon may function as a reducing agent. The regeneration process is typically carried out for a time period of about 24 to 28 hours, although longer time periods, e.g., about 48 hours, may also be employed.

Alternatively, the medium within the filtration/purification assembly of the invention may be regenerated after use by heating the medium to greater than about 300° C., and preferably to a temperature of about 450° C. to about 550° C., in the presence of a reducing atmosphere, such as a hydrogen-containing atmosphere. For example, the medium may be regenerated by heating to greater than about 500° C. and maintaining the medium at that temperature for about one hour while it is purged with a mixture of hydrogen and an inert gas. Preferably, the regeneration process is carried out using an atmosphere of an inert gas having from about 2 percent to about 100 percent hydrogen (vol:vol), more preferably from about 10 percent to about 40 percent hydrogen. Typically, the regeneration of the reactive medium is carried out for a time period of from about 8 to about 28 hours under these conditions. As with the activation process used to originally form the active sites, the regeneration may also be carried out under an inert gas containing a lesser amount of hydrogen. With lower concentrations of hydrogen, longer times and/or higher temperatures are typically employed for the regeneration process. For example, the regeneration of a stainless steel reactive medium may be carried out by heating the medium for 12 to 24 hours at about 500° C. while purging with a 35:65 (vol:vol) mixture of hydrogen and nitrogen.

Assembly of the device according to the present invention may be accomplished by various methods. The manner in which the devices of the present invention are assembled depend, in part, on the types of barrier members employed and the particular configuration of the housing. In most embodiments of the invention it is preferred that the individual components, i.e., reactive filter, barrier members, etc., be located in the appropriate section of the housing and, as appropriate, thereafter treated to put the active carbon and metal coatings thereon. In those instances in which another type of barrier member is employed, such as a valve, the device is partially assembled with the housing portion containing the metal filters coated with a carbon layer and containing active metal species formed separately from the housing portion containing a valve and the two housing sections are thereafter joined. The exact order in which the barrier member(s) and reactive filter medium are joined to or within the housing section(s) depends in part on the manufacturing and assembly facilities. Typically, the downstream barrier member, such as a small reactive type filter is fixedly positioned in the outlet which communicates with the housing, transverse to the downstream opening of the outlet such that all fluid passing out of the housing during operation, or into the downstream side of the housing immediately prior to placing the filter unit into service, must pass through the reactive type filter.

The manner of permanently locating the reactive type filter in the outlet could be accomplished by swaging, staking, brazing, sintering or press-fitting of the barrier member at the appropriate location.

Thus, by way of example, in the embodiments illustrated in FIGS. 2 and 3, a metal filter element, such as a precursor substrate to a reactive filter, i.e., prior to carbon coating and bonding of metal species, may be located, fixedly or removably, at the end of the downstream outlet 19. The outlet may be formed as part of a downstream housing section 15a or 15a' or may be attached to section 15a or 15a' by methods such as welding, either before or after the downstream barrier member is fixedly positioned in the outlet. The principal reactive metal filter which is the precursor or substrate prior to coating to form the fluid permeable, reactive medium filter 13 (in FIGS. 2 and 3) may then be located in the housing by removably or fixedly securing the metal filter substrate to either or each of housing sections 15b (or 15b') and 15a (or 15a'), with or without the outlet 19 joined thereto. Typically housing element 15b (or 15b'), reactive filter medium 13 and housing member 15a (or 15a') are joined by welding, brazing or similar technique. In the embodiment illustrated in FIG. 3, the metal filter substrate, which ultimately becomes a barrier member 21', which is the same as or substantially similar to the downstream barrier member 23 or 23', is fixedly or removably positioned in the inlet 17'. This is done preferably at the entrance or upstream end of the inlet 17' in the same manner as is done at the outlet 19. As with the outlet 19 in housing section 15a, the inlet 17' and housing section 15b' may be attached to one another either before or after the metal filter substrate which forms reactive medium filter 21' is fixedly positioned in the inlet 17'.

In the embodiment of the type illustrated in FIG. 3, in some instances the upstream housing section(s), inlet and filter member may have a similar or identical configuration to the downstream housing section(s), outlet and filter member. Costs of manufacturing can be saved when the upstream and downstream portions of the assembly are identical.

The metal filter substrates, positioned within the designated portions of the assembly, may be more efficiently coated with carbon and activated with metal species by positioning the metal filter substrates in the appropriate housing section(s) prior to the treatment steps and thereafter assembling the separate housing sections. Thus, in the embodiment illustrated in FIG. 2, the outlet 19 and housing sections 15a and 15b, containing the metal filter substrate which forms the reactive filter medium 13, are separately assembled and treated to produce carbon coatings bonded to active metal species prior to joining the upstream housing section 15c and the inlet 17 containing the poppet valve 21. The upstream housing section 15c may be joined by welding or the like to housing section 15b. A similar procedure may be used with the embodiment of FIG. 3.

Coating of the metal filters and activation with metal species to form the reactive filter medium and barrier member(s) of the reactive filter type may be performed in the manner indicated above and in U.S. Pat. No. 5,637,544. Alternatively, the following modified procedure may be employed. The filtration/purification assembly or portion thereof containing metal filter substrate(s) may be initially subjected to a treatment with a reducing agent. Thus, the portion of the filter assembly containing the metal filter substrates may be connected to a manifold which is also in fluid communication with sources of an inert gas or a noble gas, such as argon, helium and in some instances nitrogen, as well as hydrogen and carbon monoxide. Initially, to purge air and atmospheric contamination from the assembly, the inert gas, such as argon, is supplied to the housing at a rate of 0.7 to 1.2 cc/min-mm$^2$, typically at or slightly above ambient temperature. Thereafter, in order to strip the surface of the naturally occurring mixed oxides present on the surface of metals, such as iron and chromium oxides, typically present on a stainless steel surface, and form a reduced metal surface, argon flow is terminated and the system is purged with purified hydrogen at a rate of about 0.8 to about 1.5 cc/min-mm$^2$. The purging is continued at ambient temperature for approximately 10 to 20 minutes or until hydrogen completely displaces argon from the system. The temperature is then increased to about 400 to about 450° C. at a rate of about 2 to 8 C.°/min. Hydrogen flow is allowed to continue as the filter is maintained within this temperature range for about 3 hours to from a uniformly reduced or elemental metal surface. Thereafter, an inert or a noble gas, such as 100% argon, is passed through the filtration/purification assembly at a flow rate of about 2.2 to about 2.6 cc/min-mm$^2$. Argon flow is continued through the assembly and the temperature is permitted to drop to about 300 to about 350° C.

A controlled oxidation step is then conducted which renders a relatively thick and uniform oxide on the surface of the metal which consists primarily of iron oxide when a metal such as stainless steel is employed. This uniform iron oxide layer acts as a catalyst to promote uniform dissociation of carbon monoxide and deposition of elemental carbon on the substrate surface. This also has the effect of increasing the number of active metal sites on the carbon of the reactive filter element. The oxygen is introduced to the assembly to provide an oxygen and argon mixture containing about 35% to about 45%, preferably about 40% oxygen with a flow rate of about 2.2 to about 2.6 cc/min-mm$^2$. Flow of this oxygen/argon mixture is continued within the range of about 300 to about 350° c. for a period of about 2 to about 4 hours, preferably about 2.5 hours. Thereafter, the furnace in which the reactive filter element is heated is turned off and 100% argon is passed through the assembly at a flow rate of about 2.2 to about 2.6 cc/min-mm$^2$ for a time sufficient to allow the uniformly oxidized substrate to cool to or close to room temperature if carbon coating is not begun immediately thereafter. Subsequently, as described above, the oxidized metal filter substrate is coated with carbon and active metal species are introduced to the carbon with a vapor deposition process or a solvent-metal procedure as described above.

As a result of the procedure of reducing and subsequently providing a uniform oxidized surface to the metal filter substrate or element, the ratio of the total surface area of the carbon coating to the total surface area of the metal filter substrate is about 25 to 65 $m^2/m^2$ as compared to 2.3 to 3.6 $m^2/m^2$ without oxidation pretreatment. This also produces a ratio of sodium metal coating (when the carbon is activated with sodium metal species) to surface area of carbon coating of about 1.2 to about 1.6 mg $Na/m^2$ carbon. The resultant oxygen capacity is about 4 to about 6 times greater than without oxidation pretreatment.

EXAMPLE

An example of a specific method of preparing the housing or housing portions containing metal filter substrates prior to coating with carbon and bonding metal species to active sites on the carbon, such that the metal substrates have a uniform oxide coating may be performed as follows. A housing section containing a metal filter substrate welded in place across a fluid flow path was attached to a manifold that was in turn connected to sources of several different pure gases. The housing section was supported within a furnace and was initially purged of atmospheric contamination with purified argon at a flow rate of 500 cc/min for approximately 10 minutes at ambient temperature. Thereafter, the flow of argon through the housing section was discontinued and the housing section was purged with purified hydrogen at a flow rate of 600 cc/min, also at ambient temperature, for a period of about 10 to 20 minutes. The temperature of the housing section containing the metal substrate was gradually increased to 425° C. at a rate of 2 C.°/min. The housing section was maintained, with hydrogen flowing at a rate of 600 cc/min, at 425° C. for three hours. Thereafter, hydrogen flow was discontinued and pure argon was passed through the housing section at a flow rate of 1500 cc/min. With argon flowing through the housing section at the same rate, the temperature of the housing section was allowed to decrease to 305° C. Thereafter, oxygen was mixed with argon to provide a gaseous mixture flowing through the housing section of 40% oxygen and 60% argon at a flow rate of approximately 1500 cc/min. This was continued for a period of 2.5 hours at a temperature of 305° C. Thereafter, the furnace was turned off and 100% argon was passed through the housing section at a rate of 1500 cc/min. Carbon deposition and activation of sites on the carbon deposit were performed as indicated above.

What is claimed is:

1. A reactive medium for purifying a fluid comprising:
   a porous metal substrate;
   a layer including carbon;
   an oxide layer between the porous metal substrate and the layer including carbon; and
   active sites including at least partially deoxygenated metal species, the active sites being bonded to the layer including carbon.

2. The reactive medium of claim 1 wherein the oxide layer comprises oxidized metal of the substrate.

3. The reactive medium of claim 2 wherein the oxide layer is disposed on substantially all surfaces of the porous metal substrate.

4. The reactive medium of claim 3 wherein the oxide layer comprises iron oxide.

5. The reactive medium of claim 4 wherein the metal comprises stainless steel.

6. The reactive medium of claim 1, wherein the oxide layer is disposed on substantially all surfaces of the porous metal substrate.

7. The reactive medium of claim 1 wherein the oxide layer is uniformly disposed between the porous metal substrate and the carbon layer.

8. The reactive medium of claim 1 wherein the ratio of the total surface area of the carbon coating to the total surface area of the metal substrate is in the range from about 25 to about 65 $m^2/m^2$.

9. The reactive medium of claim 1 wherein the partially deoxygenated metal species is selected from the group consisting of alkali metals, manganese, magnesium, and mixtures thereof.

10. The reactive medium of claim 9 wherein at least one of the deoxygenated metal species includes sodium.

11. The reactive medium of claim 10 wherein the ratio of sodium metal to surface area of carbon is the range from about 1.2 to about 1.6 mg sodium/$m^2$ carbon.

12. The reactive medium of claim 1 wherein the metal of the porous metal substrate is selected from the group consisting of nickel, the Hastalloy family of metals, the Monel family of metals, and stainless steel.

13. A reactive medium for purifying a fluid comprising:
    a porous metal substrate;
    an oxide layer disposed on substantially all surfaces of the porous metal substrate;
    at least one layer of carbon disposed on the oxide layer; and
    active sites including at least partially deoxygenated metal species, the active sites being bonded to the carbon layer and including at least one of manganese, magnesium, and an alkali metal.

14. The reactive medium of claim 13 wherein the metal of the porous metal substrate is selected from the group consisting of nickel, the Hastalloy family of metals, the Monel family of metals, and stainless steel, and wherein the oxide layer comprises oxidized metal of the substrate.

15. The reactive medium of claim 13 wherein the porous metal substrate comprises stainless steel and the oxide layer comprises iron oxide.

16. The reactive medium of claim 15 wherein the iron oxide layer is disposed on substantially all surfaces of the stainless steel substrate.

17. A reactive medium for purifying a fluid comprising:
    a porous stainless steel substrate;
    a layer including carbon;
    an oxide layer between the porous stainless steel substrate and the layer including carbon, the oxide layer comprising iron oxide and being disposed substantially on all surfaces of the porous metal substrate; and
    active sites including at least partially deoxygenated metal species, the active sites being bonded to the layer including carbon.

18. The reactive medium of claim 17 wherein the partially deoxygenated metal species is selected from the group consisting of alkaline metals, manganese, and magnesium, and mixtures thereof.

* * * * *